Oct. 15, 1929.   I. J. McCULLOUGH ET AL   1,731,930
METHOD FOR PERFORATING PIPE OR THE LIKE
Original Filed March 15, 1924   3 Sheets-Sheet 1
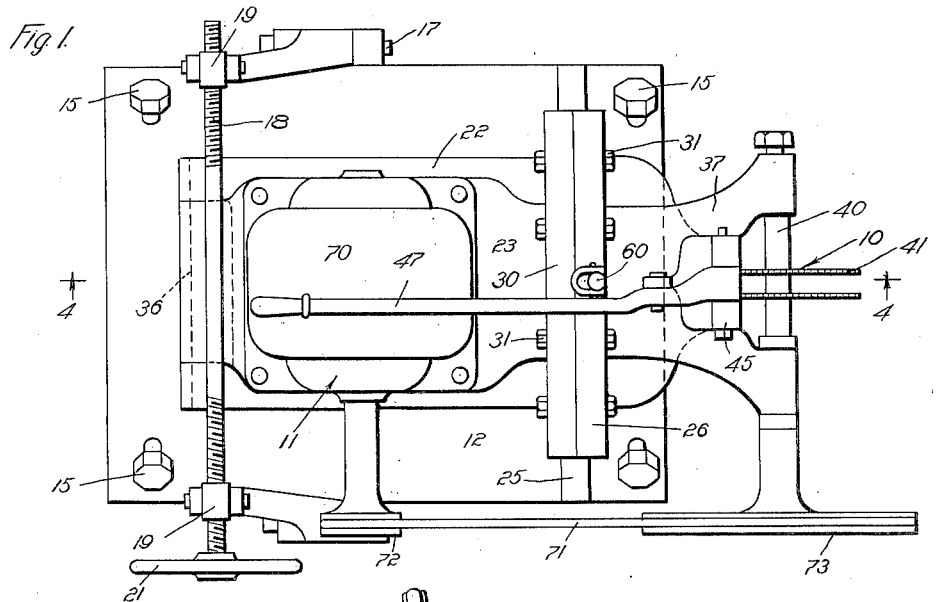
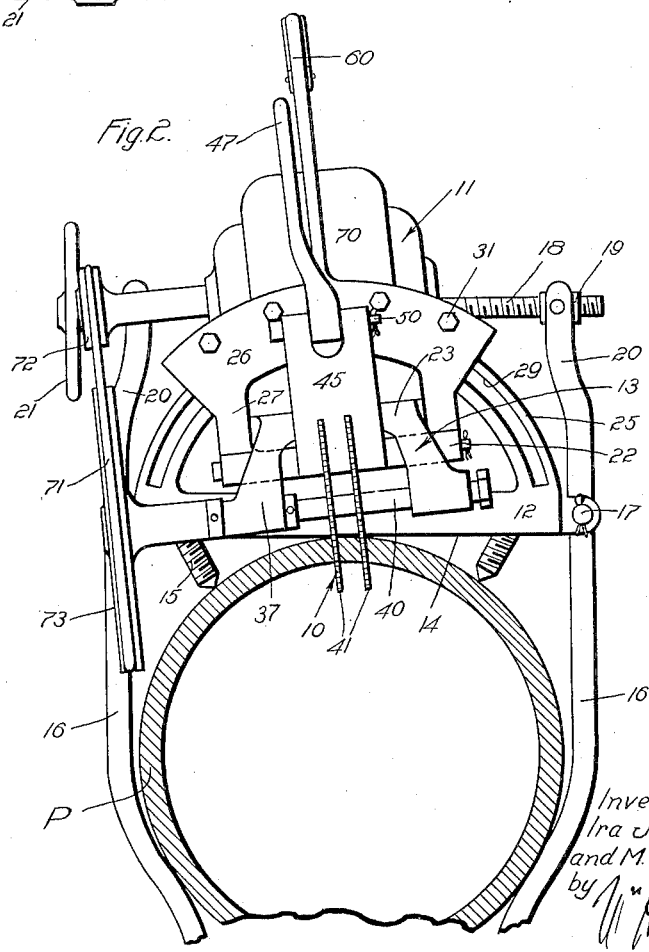
Inventors
Ira J. McCullough
and M. Sumter Black
Attorney Oct. 15, 1929.  I. J. McCULLOUGH ET AL  1,731,930
METHOD FOR PERFORATING PIPE OR THE LIKE
Original Filed March 15, 1924  3 Sheets-Sheet 2
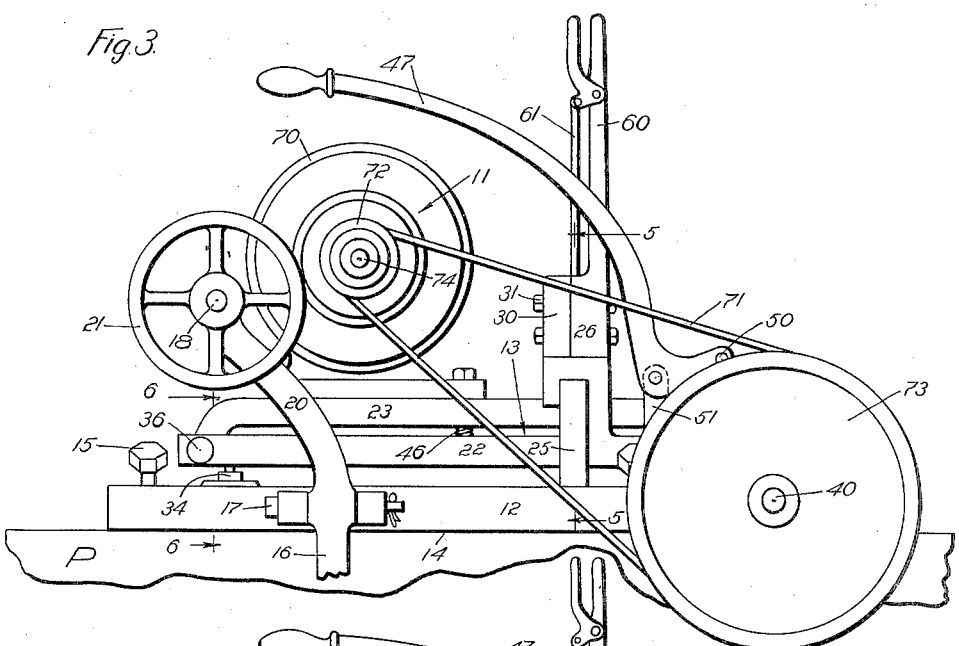
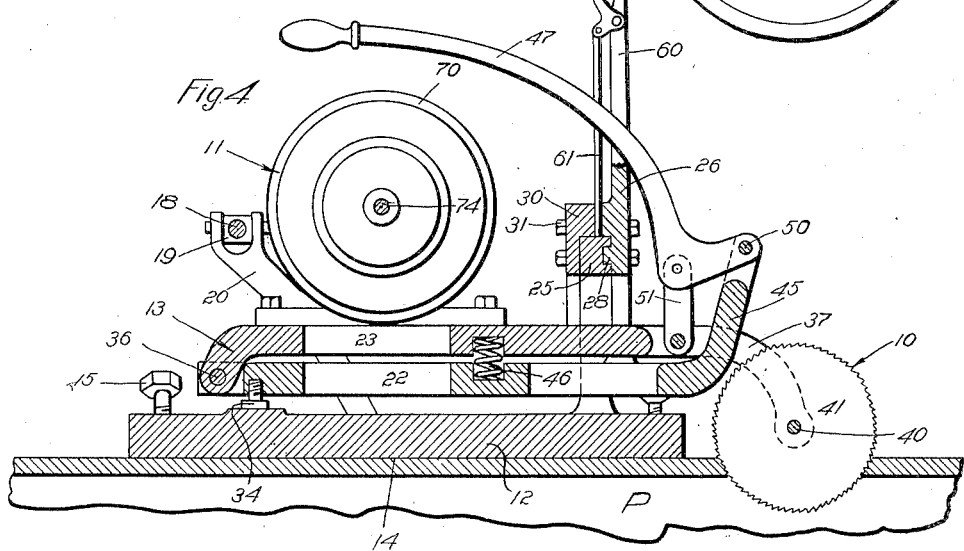
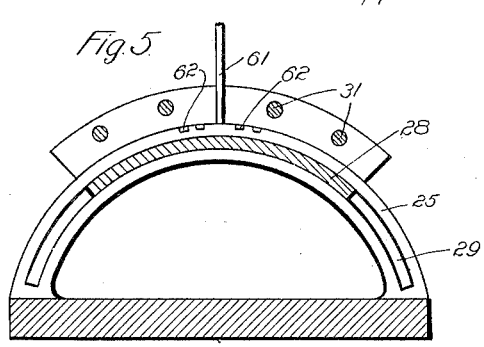
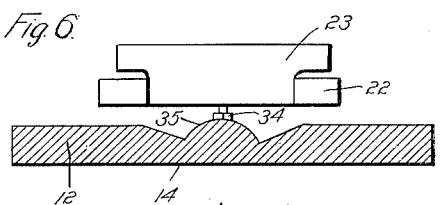
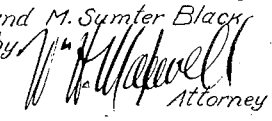
Inventors
Ira J. McCullough
and M. Sumter Black
by
Attorney

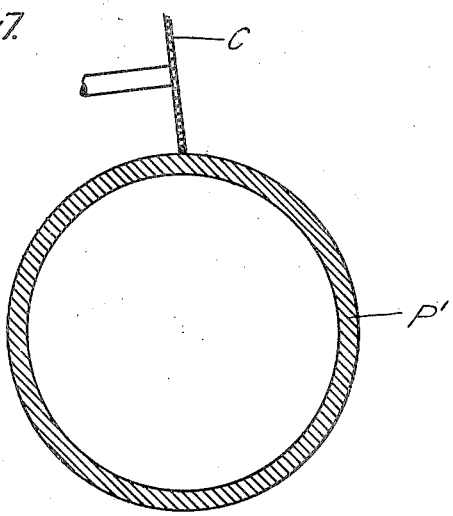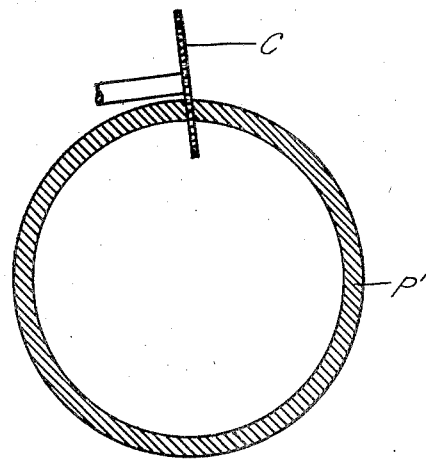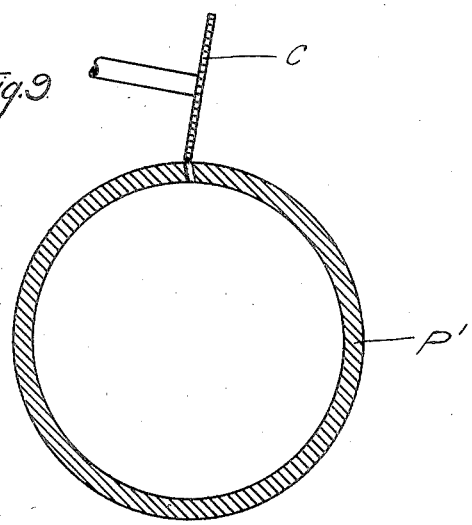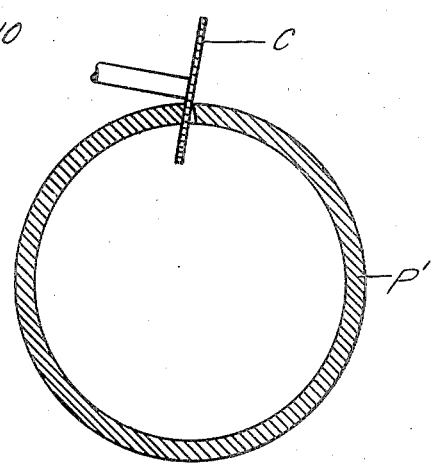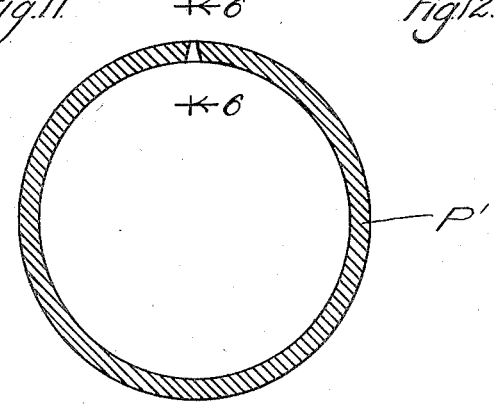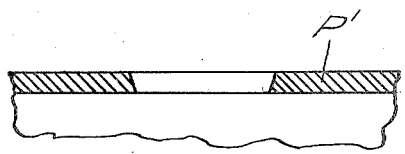

Patented Oct. 15, 1929

1,731,930

UNITED STATES PATENT OFFICE

IRA J. McCULLOUGH AND MILLARD SUMTER BLACK, OF HUNTINGTON PARK, CALIFORNIA

METHOD FOR PERFORATING PIPE OR THE LIKE

Original application filed March 15, 1924, Serial No. 699,460. Divided and this application filed November 3, 1926. Serial No. 145,960.

This invention has to do with a method for perforating pipe or the like and it is an object of the invention to provide a simple, effective and practical method for perforating pipe to be used in wells or the like.

This application is filed as a division of our co-pending application entitled "Apparatus for perforating pipe, or the like", filed March 15th, 1924, Serial No. 699,460.

An object of this invention is to provide a simple, effective and practical method of forming an inwardly divergent perforation in a pipe, or the like, from the exterior of the pipe.

Another object of our present invention is to provide a method of perforating pipe which can be carried out with simple, inexpensive apparatus and on a practical and commercial basis.

The various objects and features of our invention will be best and more fully understood from the following detailed description of a typical preferred manner of carrying it out, throughout which description, reference is had to the accompanying drawings, in which:

Fig. 1 is a plan view of a machine capable of carrying out the method provided by this invention;

Fig. 2, is a front elevation of the machine;

Fig. 3, is a side elevation of the machine;

Fig. 4, is a longitudinal detailed sectional view of the machine, taken substantially as indicated by line 4—4 on Fig. 1;

Fig. 5, is a detailed sectional view, taken as indicated by line 5—5 on Fig. 3;

Fig. 6, is a detailed sectional view, taken as indicated by line 6—6 on Fig. 3.

Fig. 7 is a diagrammatic view of a disk cutter in position with relation to a section of pipe before starting the first cut which is the initial step of our method. Fig. 8 is a diagrammatic view similar to Fig. 7 showing the position of the cutter after completion of the first cut. Fig. 9 is a diagrammatic view showing the cutter in position to make the second cut. Fig. 10 is a diagrammatic view showing the position of the cutter after the second cut has been made. Fig. 11 is a sectional view of a piece of pipe, or the like, showing the cross sectional configuration of the opening formed in the pipe after the cuts illustrated in Figs. 8 and 10 have been finished. Fig. 12 is a longitudinal sectional view taken as indicated by line 12—12 on Fig. 11 showing the configuration of the ends of the opening.

The present invention, as before stated, has particular reference to a method for perforating pipe, or the like, to produce perforated pipe suitable for use in wells, particularly, oil wells. Perforated pipe is employed in wells, for instance, oil wells, for the purpose of admitting fluid into the well without admitting sand, or the like. A general object of this invention is to provide a method of forming a perforation which has inwardly divergent side walls and inwardly convergent end walls, it being preferred that the side walls be flat, and the end walls somewhat concave. Certain broad features of our present invention are not necessarily limited to this specific form of perforation so, therefore, it is to be understood that this particular form of perforation is referred to merely as an example of a perforation such as may be made with our present method.

In carrying out the method provided by our invention, we preferably employ a disk cutter, the diameter of which is somewhat larger than the perforation to be formed, and the periphery of which is to be formed with suitable cutting parts or teeth. The cutter is rotated and is moved into engagement with the pipe to cut a straight elongate slot in it. The slot thus formed is, of course, very slightly greater in width than the cutter, has flat smooth sides, and somewhat concave inwardly convergent ends. With the first cut thus made the cutter is withdrawn from the pipe and the plane of the cutter varied or changed with relation to the pipe about an axis at or close to the outer surface of the pipe at the first made opening, preferably by moving or tilting the cutter with relation to the pipe. The cutter is then again moved into engagement with the pipe so that it enters the first made cut and operates to remove or cut away one side of the first made cut and thereby enlarge the inner portion of the cut or opening made in the pipe so that the opening has inwardly divergent side walls, the entrance to the outer part of the opening remaining the same or substantially the same in width as made by the first cut. The cutter on the second cut is preferably fed into the pipe an amount equivalent to the amount that it was fed into the pipe upon the first cut. To remove any burrs or rough edges that there may be in the opening or perforation the cutter, while in the pipe at the end of the second cut, may be swung back to its original angular position with relation to the pipe, and, if necessary, between its two angular positions, whereupon it can be removed from the pipe leaving the slot or perforation completely finished. By our present method an inwardly divergent slot is formed with the use of a simple disk cutter by two simple operations of the cutter and entirely from the exterior of the pipe. The first cut having been made the inward divergence is given to the opening or perforation by cutting away one wall of the first cut through the first made opening at the exterior of the pipe.

In Figs. 7 to 11, inclusive, of the drawings we illustrate successive operations in perforating a pipe. In accordance with one manner of carrying out our process, a disk cutter C is related to the pipe P' as shown in Fig. 7 so that its peripheral edge engages the exterior of the pipe P'. The cutter is preferably tilted or pitched somewhat with reference to the pipe as clearly shown in the drawings. The cutter C is rotated and the pipe and cutter moved relative to each other so that the cutter enters laterally through the pipe as shown in Fig. 8. By this operation a straight elongate slot is made in the pipe. When the first cut has thus been made, the cutter C is withdrawn from the pipe P' and the plane or angular position of the cutter C with relation to the pipe P' is varied or changed as shown in Fig. 9. This shifting or changing of position between the pipe and cutter is preferably about an axis at or close to the outer surface of the pipe P' at the first made opening. The cutter C and pipe are then again shifted relative to each other so that the cutter cuts away one side of the opening made by the first cut. The cutter thus undercutting one side of the opening enlarges the inner portion of the opening so that the opening has divergent side walls, as clearly shown in Fig. 11. The two cuts are preferably made equally deep in the pipe. The ends of the slot formed as described are slightly outwardly divergent as shown in Fig. 12.

The machine set forth in our above mentioned co-pending application is particularly suited for carrying out our present method, so therefore, we will proceed to describe in detail, the construction and mode of operation of such machine. This machine which is illustrated throughout the accompanying drawings includes, generally, a cutter 10, power means 11 for operating the cutter, and a support for the cutter. The support, in accordance with the preferred form of construction, includes a base 12 adapted to be mounted on the pipe P, and a carrier 13 supporting the cutter 10 so that the cutter can be tilted or adjusted about an axis longitudinal of the pipe and can be moved or fed into and out of engagement with the pipe. The base 12 may be in the form of a plate having a straight bottom 14 adapted to engage or seat on the pipe P. The base is provided with means for bracing it on the pipe P, which means may, when the base is in the form of a flat plate, include a plurality of set screws 15 which project downwardly through the plate to engage the pipe, in the manner clearly illustrated in Fig. 2 of the drawings. This particular means of bracing the base is extremely simple, and is readily adjustable to accommodate pipe of various sizes, and is adjustable to adjust or vary the angularity between the base and pipe if such becomes necessary.

It is desirable to equip the machine with means for releasably connecting the base 12 with the pipe P so that the base will not shift or move on or with relation to the pipe during operation of the machine. In accordance with the broader aspects of our invention various means may be provided for connecting or securing the base on the pipe. In the drawings we have disclosed a clamping device for this purpose. The clamping device includes jaws 16, pivotally connected with the base and adapted to clamp onto the pipe. The jaws may be connected with opposite sides of the base 12 by suitable pivot pins 17, and may be shaped and proportioned to accommodate and properly grip the pipes or casings on which the machine is to be used. Suitable means may be provided for operating or actuating the jaws. The actuating means illustrated in the drawings is a screw means, including a screw 18 oppositely screw threaded at its two ends. The ends of the screw are threaded through blocks 19 pivotally connected with arms 20 which extend upwardly from the jaws 16. A suitable hand wheel 21 is provided on the screw for operating it. Rotation of the screw in one direction moves or forces the arms 20 apart and thereby forces the jaws 16 together and into clamping engagement with the pipe, while rotation of the screw in the opposite direction draws the arms together and thereby releases the jaws 16. The particular mechanism just described is, of course, one particular form of mechanism that may be employed in carrying out our invention, and has been herein set forth simply because it is simple, effective and convenient.

In the particular form of construction illustrated in the drawigns, the carrier 13 includes, generally, a body 22 which is connected with the base 12, and an arm 23 connected with the body 22. The body 22 is spaced somewhat above the base 12, and is in the form of an elongate frame. The body 22 is pivotally connected with the base 12 so that it is movable or can be tilted relative to the base about an axis longitudinal of the machine, or the pipe to which the machine is applied, and located at or close to the outer surface of the pipe. Although the desired pivotal connection between the base and body may be obtained in various manners we have found it desirable to provide an arcuate segment 25 at the upper side of the base, and an arcuate segment 26 in connection with the body to cooperate with the segment 25. The segment 25 is rigidly connected by its ends to the base 12 so that it is concentric with the pivotal axis of the body, or, in other words, so that its axis or center is at or close to the plane of the pipe to which the machine is applied. The segment 26 is rigidly connected with the body by sluitable legs 27 and is shaped and curved to fit or correspond to the front of the segment 25. A concentric rib 28 may be provided on the face of one of the segments to slidably fit a concentric groove 29 in the face of the other segment to guide the segments in proper co-operating relation. The segment 26 may be held in proper engagement with the segment 25 by a retaining plate 30 which engages over or back of the segment 25, and is connected to the segment 26 by suitable bolts 31. In the particular form of machine shown in the drawings the pivotal connection just described is located at one end of the machine, which we will term the forward end, and the parts are arranged and proportioned so that the body extends freely through or between the segment 25 and base 12. The body 22 extends to the other or rear end of the base where it may be suitably supported, for instance, by a projection 34 resting on a curved bearing surface 35 provided on the base, the bearing surface 35 being concentric with the segment 25.

As a means for controlling the movement of the body with relation to the base we have provided an operating lever 60 in connection with the segment 26, and have provided a locking pin 61 in connection with the lever to cooperate with notches 62 in the segment 25 to lock the segments against relative movement. The notches may be located in the segment 25 so that the segments may be locked in various predetermined relative positions.

The arm 23 is pivotally connected to the rear end of the body, extends forward over the body, and projects beyond the forward end of the body to carry the cutter 10. The arm is pivotally connected with the body by a suitable pivot pin 36 so that it is movable about an axis transverse of the machine and the pipe to which the machine may be applied. The forward projecting portion of the arm is in the form of a yoke 37 which carries an arbor or shaft 40. The cutter 10 is mounted on or carried by the arbor 40, and is in the form of one or more disks 41 provided at their peripheries with teeth or cutting parts so that they are in the form of milling cutters. The axis of the arbor is parallel with the pivotal axis of the arm and is, therefore, transverse of the arm and is at right angles to the longitudinal axis of the machine. The arm extends freely through or between the legs 27 and between the segment 26 and body 23, so that it is free to be moved or swung the desired amount about its axis of pivotal connection with the body. The body has an upwardly extending part 45 which extends upwardly through the yoked part 37 of the arm and operates to brace and guide the forward end of the arm. The part 45 slidably fits the yoke, and, therefore, braces the arm close to the cutter. The arm 23 is normally held up or in a raised position by means of a suitable spring 46 interposed between the body and arm, and is adapted to be moved downwardly to feed the cutter into engagement with the pipe by means of an operating lever 47. The lever 47 is connected to the upper end of the projecting part 45 by a pivot pin 50, and is connected with the arm by a link 51. The arrangement of the lever and link is clearly illustrated in Fig. 4 of the drawings.

The power means 11 for operating the cutter may comprise an electric motor 70 mounted on a suitable part, for instance, the arm 23, and a drive between the motor and arbor 40 which carries the cutter. The drive between the motor and arbor may be in various forms; we have shown a belt 71 running over pulleys 72 and 73 mounted on the motor shaft 74 and arbor 40, respectively.

In operation the machine is applied to a pipe by placing the base 12 on the pipe and securing it in position by means of the clamping jaws 16. The base is, of course, braced on the pipe by the set screws 15, and if so desired is supported by the set screw so that it does not actually touch the pipe. The clamping jaws are tightened onto the pipe through operation of the hand wheel 21. With the base in position the carrier, in the case of the particular machine above described, the body 22, is adjusted to the desired tilted position with relation to the base, for instance, to a position such as is shown in Fig. 2 of the drawings, so that the cutters are likewise tilted or are in position to engage the pipe somewhat diagonally. With the body adjusted and locked by the pin 61 and the cutter driven by the motor the operating lever 47 is moved downwardly causing the arm to swing or move downwardly and carry the cutter into engagement with the pipe. The operator continues to move the lever 47 down until the cutter has cut the desired distance into or through the pipe, whereupon the lever is released or moved to the up position to remove the cutter from the pipe. The body is then moved to another position with relation to the base, preferably to an opposite tilted position, and is set or locked in the desired position by means of a locking pin 61. The cutter is then again fed into engagement with the pipe by means of the lever 47, and will, upon engaging the pipe, enter the opening or openings made by the operation just described. However, as the cutters are fed through the pipe they will, due to their different angular position with relation to the pipe, cut away one side of the opening or openings in the pipe so that the finished opening or openings have inwardly divergent side walls. If necessary the cutter can be rocked or swung between its two positions to clean the opening or openings. When the second cut is completed the lever 47 may be released, whereupon the base 12 may be released and moved to another position on the pipe where the operation just described may be repeated. In Fig. 2 of the drawings we illustrate the machine in position where it has just completed the second cut. This figure of the drawings clearly illustrates the manner in which the cutter or blades enter or operate through the outer part of the opening first cut to cut away one side or wall of the cut to make the opening inwardly divergent without enlarging the outer end of the opening.

It will be obvious that the method of carrying out the process can be performed by a great number of different means, and that the herein disclosed method is not confined to being carried out with the specific mechanism herein illustrated. As an example of other means which may be employed for carrying out the method, may be mentioned a portable hand carried device including a rotary cutter, which device may be moved into engagement with the pipe by hand at one angle, after which the device can be moved to wthdraw the cutter from the pipe and thereafter tilted and moved to cause the cutter to enter the same opening at a different angle to enlarge the inside of the opening.

Having described only a typical preferred form of our invention we do not wish to limit ourselves to the specific details hereinabove set forth but wish to reserve to ourselves any changes or variations that may appear to those skilled in the art or fall within the scope of the following claims.

Having described our invention, we claim:

1. The method of forming a perforation in a completed pipe, or the like, which includes, cutting an elongate slot in the pipe from its exterior, and then bevelling away one side of the slot inwardly from the exterior of the pipe.

2. The method of forming a perforation in a completed pipe, or the like, which includes cutting an elongate slot in the pipe from its exterior and then bevelling away one side of the slot inwardly and by entering the slot through the opening made in the outer surface of the pipe by the first operation.

3. The method of forming an inwardly divergent perforation in a pipe, or the like, with a revolving disk cutter which includes, cutting a straight slot in the pipe with the cutter from the exterior of the pipe, and then cutting away one side of the slot with the cutter from the exterior of the pipe.

4. The method of forming an inwardly divergent perforation in a pipe from its exterior with a revolving disk cutter which includes, bringing the cutter and pipe into engagement so that the cutter cuts a straight elongate slot in the pipe, separating the cutter and pipe, tilting the cutter about an axis substantially at the outer end of the slot, and then bringing the cutter and pipe into engagement so that the cutter cuts away one side of the slot.

5. The method of forming a perforation in a completed pipe, which includes passing a cutting tool through the pipe from the outside and then passing a cutting tool through the opening at an angle whereby to enlarge the inside of the opening.

6. The method of forming a perforation in a pipe consisting of cutting through the pipe at an angle out of alinement with any radii of the pipe, and then moving a cutting tool through the same opening at a different angle whereby to enlarge the inside of said opening.

In witness that we claim the foregoing we have hereunto subscribed our names this 20th day of September, 1926.

IRA J. McCULLOUGH.
MILLARD SUMTER BLACK.